(12) United States Patent
Lee

(10) Patent No.: US 10,399,885 B2
(45) Date of Patent: Sep. 3, 2019

(54) DEVICE AND A METHOD FOR FORMING GLASS

(71) Applicant: SAMSUNG DISPLAY CO., LTD., Yongin-si, Gyeonggi-do (KR)

(72) Inventor: Jeongseok Lee, Osan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 79 days.

(21) Appl. No.: 15/490,294

(22) Filed: Apr. 18, 2017

(65) Prior Publication Data

US 2017/0297945 A1   Oct. 19, 2017

(30) Foreign Application Priority Data

Apr. 19, 2016   (KR) .......................... 10-2016-0047791

(51) Int. Cl.
*C03B 23/035* (2006.01)
*C03B 23/025* (2006.01)

(52) U.S. Cl.
CPC ................................ *C03B 23/0357* (2013.01)

(58) Field of Classification Search
CPC . C03B 23/02; C03B 23/0256; C03B 23/0357; C03B 23/023; C03B 23/025; C03B 23/0252; C03B 23/0305; C03B 23/035
See application file for complete search history.

(56) References Cited

U.S. PATENT DOCUMENTS

| 5,147,437 A * | 9/1992 | Bristol ................ B29C 33/3842 264/1.8 |
| 2011/0067450 A1 * | 3/2011 | Fredholm ............... C03B 21/02 65/81 |
| 2012/0144866 A1 * | 6/2012 | Liu ...................... C03B 23/0302 65/104 |
| 2014/0290309 A1 * | 10/2014 | Chang ................. C03B 23/0357 65/25.4 |

FOREIGN PATENT DOCUMENTS

| KR | 10-1260434 | 4/2013 |
| KR | 10-2014-0146836 | 12/2014 |

* cited by examiner

*Primary Examiner* — Cynthia Szewczyk
(74) *Attorney, Agent, or Firm* — F. Chau & Associates, LLC

(57) ABSTRACT

A device for forming a glass includes a housing member, a support member, and an intake member. The housing member includes a first part, at least one suction hole, and a plurality of sidewalls. The first part is substantially parallel to a surface defined by first and second directions. The suction hole is defined in the first part. The sidewalls extend from the first part. The support member is disposed on the first part. The support member includes a first surface configured to support the glass, a second surface overlapping and facing the first surface in a thickness direction, and a plurality of side surfaces configured to connect the first surface to the second surface. Each of first and second side surfaces of the side surfaces face each other and have a curved shape. The intake member is configured to perform an intake operation through the suction hole.

18 Claims, 12 Drawing Sheets

DEVICE AND A METHOD FOR FORMING GLASS

CROSS-REFERENCE TO RELATED APPLICATION

This application claims priority under 35 U.S.C. § 119 to Korean Patent Application No. 10-2016-0047791 filed on Apr. 19, 2016 in the Korean Intellectual Property Office, the disclosure of which is incorporated by reference herein in its entirety.

TECHNICAL FIELD

Exemplary embodiments of the present invention relate to a forming device, and more particularly, to a device and method for forming glass.

DISCUSSION OF RELATED ART

A liquid crystal panel may include glass. The glass may be a frontal glass, which may function as a touch window. The touch window may be configured to provide a touch sensing function to the liquid crystal panel. The touch window is mounted on a portable terminal of a device, such as a smart phone or a personal computer (PC) or a tablet computer. Although the frontal glass has a substantially planar shape, a product having a three-dimensional (3-D) shape in which at least one side surface of the glass has a curved shape may be produced.

SUMMARY

One or more exemplary embodiments of the present invention provide a device and method for forming glass, in which at least one side surface of the glass disposed on a support member through an intake operation is bent along a curved shape of the support member.

One or more exemplary embodiments of the present invention provide a device for forming glass. The device includes a housing member, a support member, and an intake member. The housing member includes a first part, at least one suction hole, and a plurality of sidewalls. The first part is substantially parallel to a surface defined by a first direction and a second direction that crosses the first direction. The suction hole is defined in the first part. The sidewalls extend from the first part. The support member is disposed on the first part. The support member includes a first surface, a second surface, and a plurality of side surfaces. The first surface is configured to support the glass. The second surface overlaps and faces the first surface in a thickness direction. Each of the side surfaces are configured to connect the first surface to the second surface. First and second side surfaces of the side surfaces have a curved shape. The intake member is configured to apply a vacuum pressure through the suction hole.

A plurality of grooves may be defined in the first part. The support member may further include a plurality of protrusions. Each of the protrusions may protrude from the second surface. Each of the protrusions may be coupled to the grooves.

A thickness of each of the protrusions may be greater than a depth of each of the grooves in the thickness direction.

The second surface may be spaced apart from the first part by the protrusions. The glass may have a thickness equal to or greater than a distance between the second surface and the first part.

The sidewalls may include first and second sidewalls facing each other in the first direction. The first and second sidewalls may respectively extend from first and second edges of the first part. The sidewalls may include third and fourth sidewalls facing each other in the second direction. The third and fourth sidewalls may respectively extend from third and fourth edges of the first part.

At least one sidewall of the first to fourth sidewalls may be attached to the other sidewalls.

At least a portion of each of inner surfaces of the first and second sidewalls may have a curved shape.

The first side surface may be spaced a predetermined distance from the first sidewall in the first direction. The second side surface may be spaced by the predetermined distance from the second sidewall in the first direction.

A distance between the glass and the first sidewall may be less than the predetermined distance in the first direction.

A distance between the glass and the second sidewall may be less than the predetermined distance in the first direction.

The sidewalls may include first and second sidewalls facing each other in the first direction. The first and second sidewalls may respectively extend from first and second edges of the first part. The sidewalls may include third and fourth sidewalls facing each other in the second direction. The third and fourth sidewalls may respectively extend from third and fourth edges of the first part. The first part may include at least one groove of which at least an area overlaps the suction hole. The groove may be recessed from the first sidewall to the second sidewall in the thickness direction.

The second surface may contact the first part.

At least a portion of each of inner surfaces of the first and second sidewalls may have a curved shape.

The side surface may be spaced a predetermined distance from the first sidewall in the first direction. The second side surface may be spaced a predetermined distance from the second sidewall in the first direction.

The groove may have a first end closer to the first sidewall than the first side surface in the first direction. The groove may have a second end closer to the second sidewall than the second side surface in the first direction.

The intake member may include: a suction pad connected to the first part and overlapping the suction hole; a connection tube connected to the suction pad; and a suction unit connected to the connection tube.

One or more exemplary embodiments of the present invention provide a method of forming a glass includes: disposing a support member on a first part of a housing member, which is parallel to a surface defined by first and second directions and in which at least one suction hole is defined; disposing the glass on each of a first surface of the support member, a second surface facing the first surface, and a plurality of side surfaces connecting the first surface to the second surface in a thickness direction; coupling an intake member to the suction hole; performing an intake operation with an intake member through the suction hole; and bending the glass in the thickness direction corresponding to the first and second side surfaces as the intake operation is performed through the suction hole. The second surface of the support member spaces apart from the first part of a housing member in the thickness direction.

The housing member may include first and second sidewalls facing each other in the first direction and respectively extending from first and second edges of the first part. The housing member may include third and fourth sidewalls facing each other in the second direction and respectively extending from third and fourth edges of the first part. The method may further include separating at least one sidewall of the first to fourth sidewalls from the rest of the sidewalls as the glass is bent.

A plurality of grooves may be defined in the first part. The support member may include a plurality of protrusions protruding from the second surface. The disposing of the support member on the first part may include coupling the protrusions to the grooves. Each of the protrusions may have a thickness greater than a depth of each of the grooves in the thickness direction.

Each of the first and second side surfaces may have a curved shape.

BRIEF DESCRIPTION OF THE DRAWINGS

These and/or other aspects will become more apparent and more readily appreciated from the following description of exemplary embodiments, taken in conjunction with the accompanying drawings, in which.

DETAILED DESCRIPTION OF THE EMBODIMENTS

Figure 1:
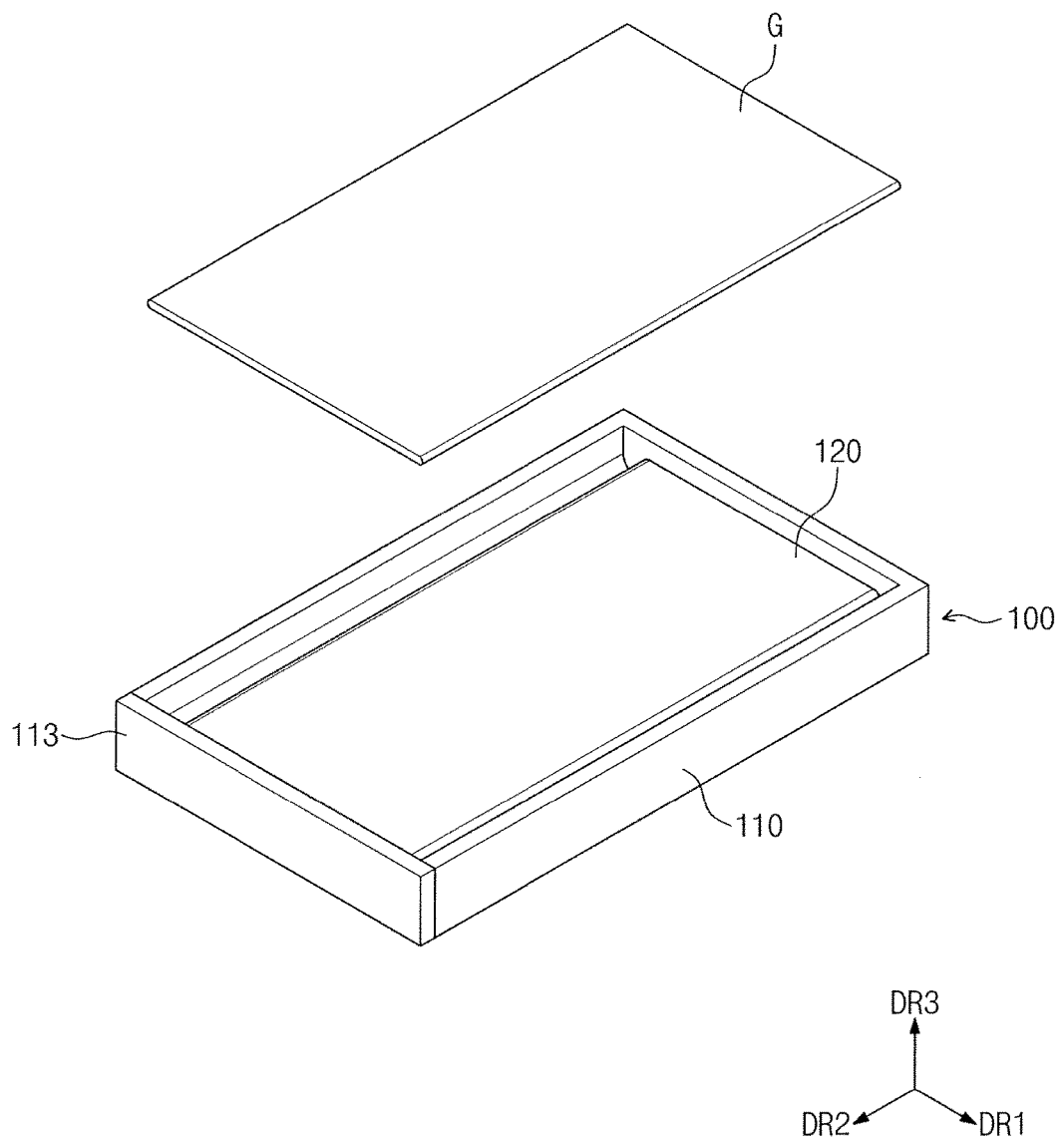
FIG. 1 is a perspective view illustrating a device for forming glass according to an exemplary embodiment of the present invention.

Exemplary embodiments of the present invention will be described below in more detail with reference to the accompanying drawings. In this regard, the exemplary embodiments may have different forms and should not be construed as being limited to the exemplary embodiments of the present invention described herein.

Like reference numerals may refer to like elements throughout the specification and drawings.

It will be understood that although the terms "first" and "second" may be used herein to describe various components, these components should not be limited by these terms.

Sizes of elements in the drawings may be exaggerated for clarity of description.

It will be understood that when a component, such as a layer, a film, a region, or a plate, is referred to as being "on" another component, the component can be directly on the other component or intervening components may be present.

Figure 2:
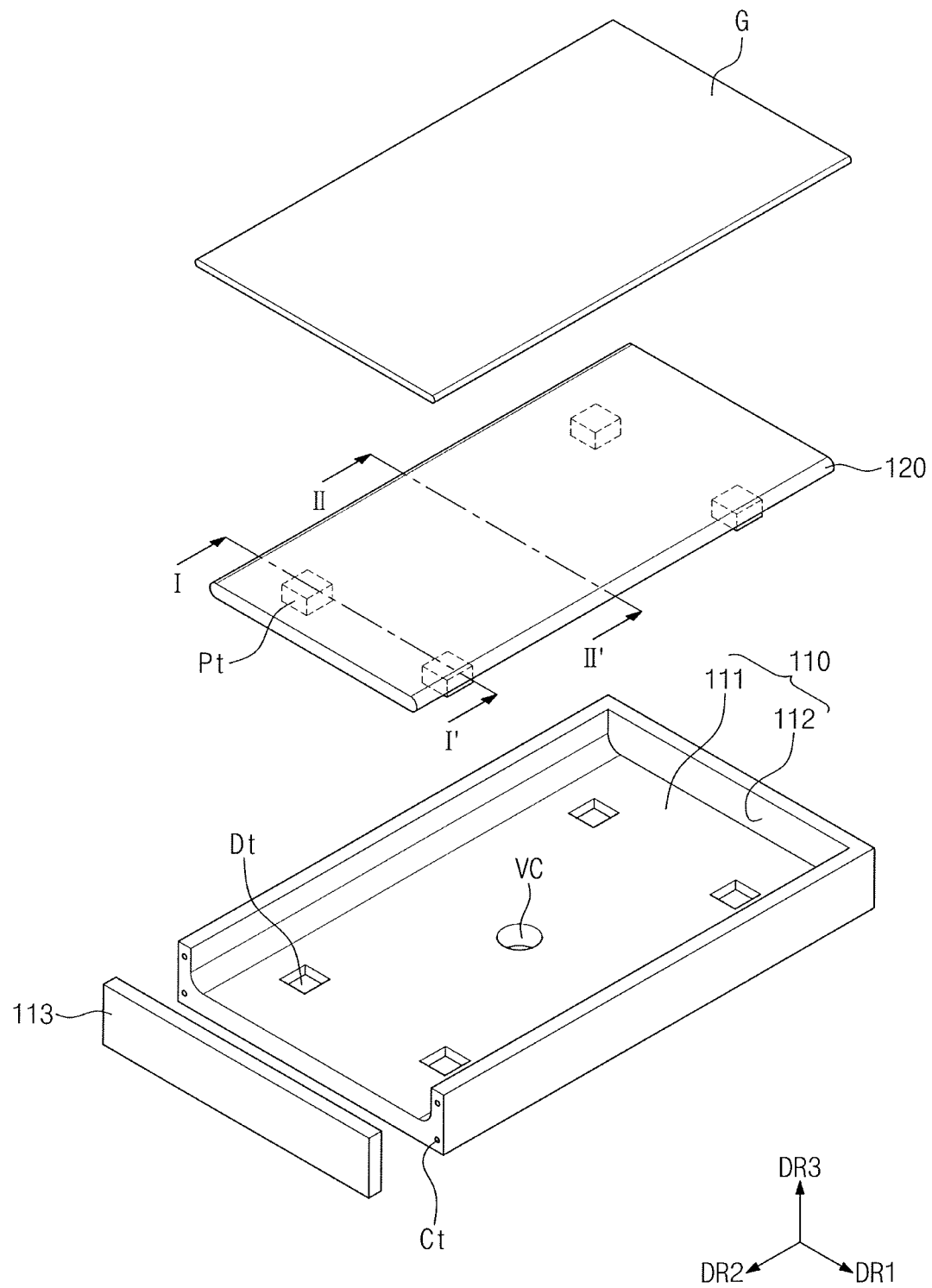
FIG. 2 is an exploded perspective view illustrating a device for forming glass according to an exemplary embodiment of the present invention.

FIG. 1 is a perspective view illustrating a device for forming glass according to an exemplary embodiment of the present invention. FIG. 2 is an exploded perspective view illustrating a device for forming glass according to an exemplary embodiment of the present invention.

According to an exemplary embodiment of the present invention, a glass G may be formed in a three-dimensional (3D) shape, for example, through a device 100 for forming the glass G. The glass G formed in the 3D shape may be used as a window of a display device. For example, the formed glass G may be a window for tablet computer or personal computer (PC), smart phones, personal digital assistants (PDAs), portable multimedia players (PMPs), game consoles, or wearable electronic devices.

Referring to FIGS. 1 and 2, the device 100 for forming the glass G may include a housing member 110 and a support member 120.

Each of the housing member 110 and the support member 120 may include an elastic material. For example, each of the housing member 110 and the support member 120 may include graphite, graphene, carbon nanotube, and/or carbon fiber.

The housing member 110 may be configured to house the support member 120. The housing member 110 may include a lower part 111 and a plurality of sidewalls 112. The support member 120 may be disposed on the lower part 111 of the housing member 110. The sidewalls 112 may extend from the lower part 111 of the housing member 110 in a third direction DR3.

The lower part 111 of the housing member 110 may be substantially parallel to a plane defined by each of the first direction DR1 and the second direction DR2. A direction substantially perpendicular to each of the first direction DR1 and the second direction DR2 may be the third direction DR3. The third direction DR3 may indicate a thickness direction of each of the glass G and the support member 120. An upper and lower surface of each of the support member 120 and the housing member 110 may be divided from each other by the third direction DR3. However, directions indicated in the first to third directions DR1, DR2, and DR3 may be relative and thus may be variously changed.

At least one suction hole VC may be defined in the lower part 111 of the housing member 110. The suction hole VC may be defined to pass through the lower part 111 of the housing member 110. Although one suction hole VC is defined in the lower part 111 in FIG. 2, the exemplary embodiments of the present invention are not limited thereto. For example, at least one suction hole VC may be defined in the lower part 111 of the housing member 110.

A plurality of grooves Dt may be defined in the lower part 111. The grooves Dt may be recessed from the lower part 111, for example, in the third direction DR3. Although four grooves Dt are illustrated in FIG. 2, exemplary embodiments of the present invention are not limited thereto. For example, the lower part 111 may include at least one groove Dt.

The sidewalls 112 may extend from the lower part 111, for example, in the third direction DR3. The sidewalls 112 may include first to fourth sidewalls. The first to fourth sidewalls may respectively extend from first to fourth edges of the lower part 111. The first and second edges may correspond to relatively long sides of the lower part 111 extending in the second direction DR2. The third and fourth edges may correspond to relatively short sides of the lower part 111 extending in the first direction DR1. However, exemplary embodiments of the present invention are not limited thereto.

According to an exemplary embodiment of the present invention, at least a portion of an inner surface of each of the first sidewall and the second sidewall of the sidewalls 112 may have a curved shape. The first sidewall may extend from the first edge of the lower part 111. The second sidewall may extend from the second edge of the lower part 111. The first sidewall and the second sidewall may face each other in the first direction DR1. However, exemplary embodiments of the present invention are not limited thereto. For example, the inner surface of each of the first and second sidewalls may have a substantially planar shape.

The third sidewall of the sidewalls 112 may be connected to each of the first and second sidewalls. The third sidewall may extend from the third edge of the lower part 111. The fourth sidewall 113 may extend from the fourth edge of the lower part 111. The fourth sidewall 113 may face the third sidewall in the second direction DR2. The fourth sidewall 113 may be coupled to each of the first and second sidewalls.

The fourth sidewall 113 may be detachable from each of the first and second sidewalls. After a method for forming the glass G is performed, the fourth sidewall 113 may be separated from each of the first and second sidewalls, for example, to separate the glass G to the outside. However, exemplary embodiments of the present invention are not limited thereto.

The fourth sidewall 114 may have an integrated shape. The integrated shape may extend from the lower part 111 of the housing member 110. After a method for forming the glass G is performed, the glass G may be separated from each of the first and second sidewalls together with the support member 120 in the third direction DR3.

Ends of each of the first and second sidewalls of the sidewalls 112 may include a plurality of coupling grooves Ct, respectively. The fourth sidewall 114 may include a plurality of protrusions. The protrusions may be configured to be inserted into the coupling grooves Ct. When the fourth sidewall 113 is coupled to each of the first and second sidewalls, the protrusions of the fourth sidewall 113 may be inserted into the coupling grooves Ct.

The support member 120 may be disposed on the lower part 111 of the housing member 110, for example, to support the glass G. The support member 120 may include an upper surface, a lower surface, and a plurality of side surfaces.

The upper surface of the supporting member 120 may be configured to support the glass G. The lower surface may face the upper surface, for example, in the third direction DR3. The side surfaces may be configured to connect the upper surface to the lower surface. The upper and lower surfaces of the support member 120 may overlap each other. The upper and lower surfaces of the support member 120 may have substantially the same length in the first direction DR1.

According to an exemplary embodiment of the present invention, each of a first side surface and a second side surface of the side surfaces of the support member 120 may have a curved shape. The first side surface and the second side surface may face each other, for example, in the first direction DR1. Edges of the glass G may have a 3-D shape corresponding to the curved shapes of the first and second sidewalls of the support member 120 in the first direction DR1. The curved shapes of each of the first and second side surfaces may vary according to the shape of the glass G. Alternatively, the side surfaces of the support member 120, which may face each other in the second direction DR2, may have shapes different from the curved shape of the glass G. However, exemplary embodiments of the present invention are not limited thereto. For example, each of the side surfaces of the support member 120 may have a curved shape corresponding to the 3-D shape of the glass G.

The support member 120 may include a plurality of protrusions Pt. The protrusions Pt may protrude from the lower surface of the support member 120, for example, in the third direction DR3. When the support member 120 is disposed in the housing member 110, the protrusions Pt may be respectively coupled to grooves Dt of the lower part 111 of the housing member 110. Thus, the support member 120 may be affixed to the housing member 110.

Figure 3:
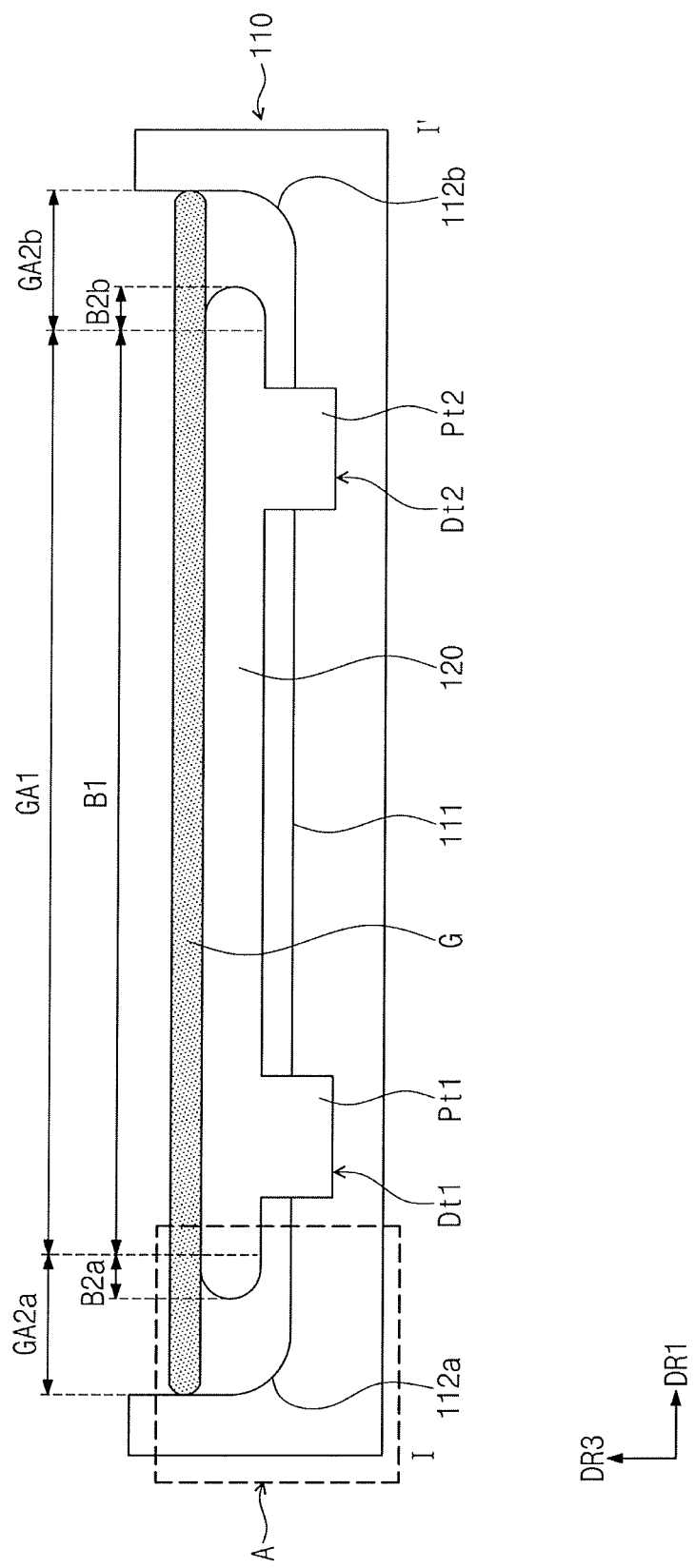
FIG. 3 is a cross-sectional view taken along a line I-I' of FIG. 2 according to an exemplary embodiment of the present invention.
Figure 4:
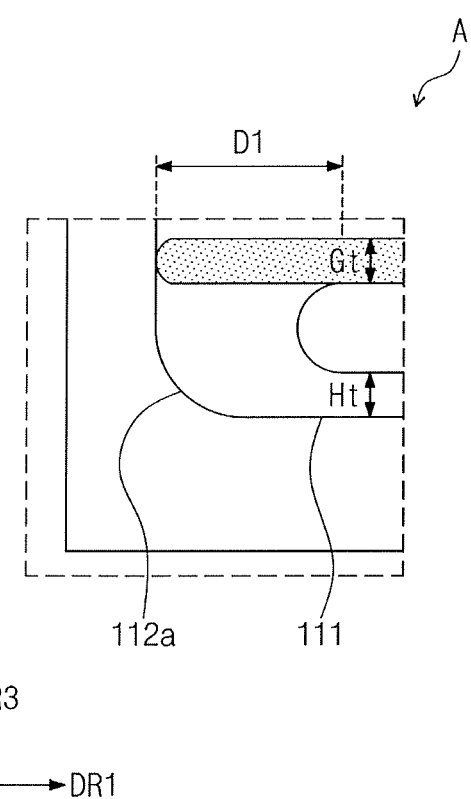
FIG. 4 is an enlarged view illustrating a region A of FIG. 3 according to an exemplary embodiment of the present invention.
Figure 5:
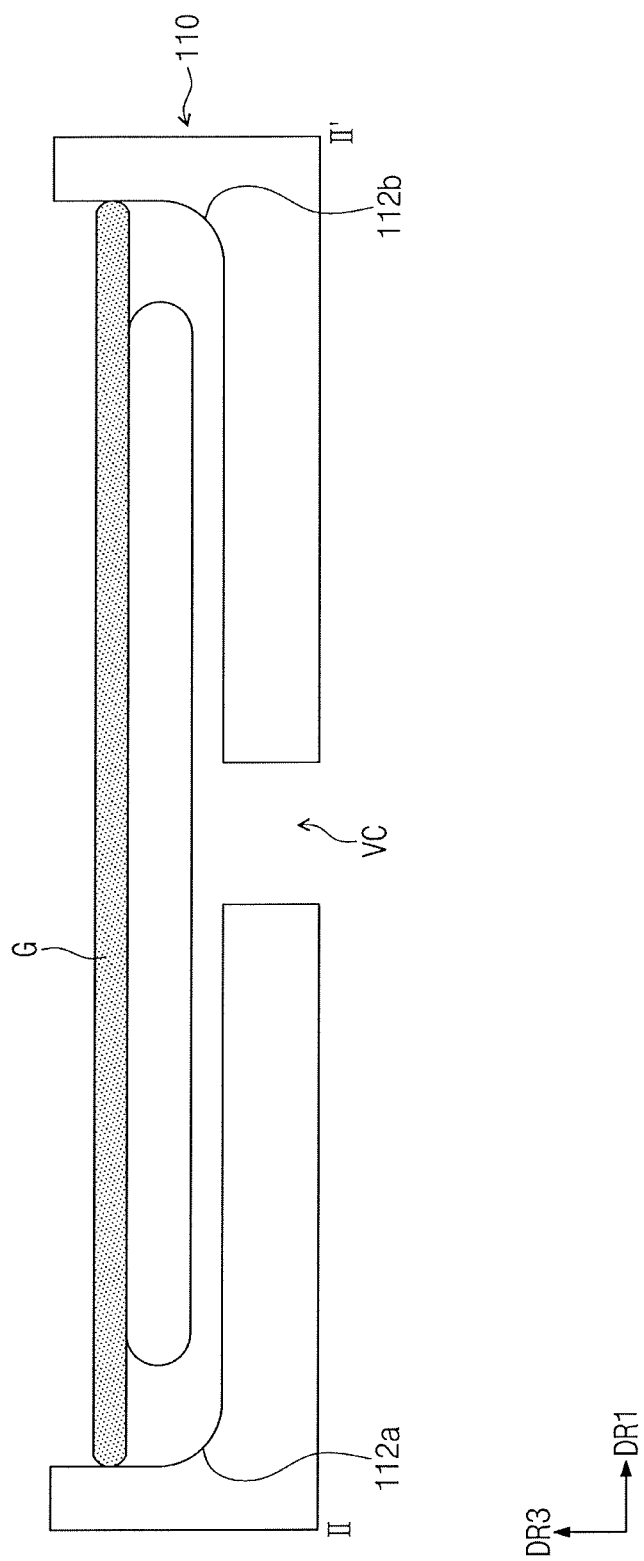
FIG. 5 is a cross-sectional view taken along a line II-II' of FIG. 2 according to an exemplary embodiment of the present invention.

FIG. 3 is a cross-sectional view taken along a line I-I' of FIG. 2 according to an exemplary embodiment of the present invention. FIG. 4 is an enlarged view of a region A of FIG. 3 according to an exemplary embodiment of the present invention. FIG. 5 is a cross-sectional view taken along a line II-II' of FIG. 2 according to an exemplary embodiment of the present invention.

Referring to FIG. 3, a structure in which the glass G is disposed on each of the upper surface of the support member 120 and the first and second sidewalls 112a and 112b of the sidewalls 112 of the housing member 110 may be provided. The first and second protrusions Pt1 and Pt2 may protrude from the lower surface of the support member 120. The grooves Dt of the lower part 111 may include first and second grooves Dt1 and Dt2.

Referring to FIGS. 2 and 3, the support member 120 may be disposed on the lower part 111 of the housing member 110. The first and second protrusions Pt1 and Pt2 protruding from the lower surface of the support member 120 may respectively overlap the first and second grooves Dt1 and Dt2. Thus, when the support member 120 is disposed on the lower part 111, the first and second protrusions Pt1 and Pt2 may be respectively coupled to the first and second grooves Dt1 and Dt2.

The protrusions Pt may have substantially the same thickness. The grooves Dt may be recessed by substantially the same depth from the lower part 111, for example, in the third direction DR3. According to an exemplary embodiment of the present invention, the thickness of each of the protrusions Pt may be greater than a depth of each of the grooves Dt. Referring to FIG. 3, the thickness of each of the first and second protrusions Pt1 and Pt2 may be greater than the depth of each of the first and second grooves Dt1 and Dt2 in the third direction DR3. Thus, the lower surface of the support member 120 may be spaced a predetermined distance from the lower part 111 in the third direction DR3.

The support member 120 may include a planar region B1, a first curved region B2a, and a second curved region B2b. The planar region B1 may be configured to support the glass G. The planar region B1 may be an area substantially parallel to the first direction DR1. The planar region B1 may be in an area defined as the upper and lower surfaces of the support member 120. The first curved region B2a may be an area defined as the first side surface of the side surfaces of the support member 120. The second curved region B2b may be an area defined as the second side surface of the side surfaces of the support member 120.

The glass G may be disposed on the upper surface of the support member 120 and substantially parallel to the first direction DR1. The glass G may include a non-forming region GA1. The non-forming region GA1 may correspond to the planar region B1 of the support member 120. The glass G may include a first forming region GA2a and a second forming region GA2b. The first forming region GA2a and the second forming region GA2b may respectively extend from sides of the non-forming region GA1 to the first and second sidewalls 112a and 112b in the first direction DR1.

The first side surface corresponding to the first curved region B2a may connect the upper and lower surfaces of the support member 120 to each other. The first side surface may have a curved shape. The upper and lower surfaces of the support member 120 may overlap each other. The upper and lower surfaces of the support member 120 may have substantially the same length in the first direction DR1. Thus, the first side surface may have a semicircular shape in the first direction DR1. The first forming region GA2a may be formed in correspondence with the first side surface.

The second side surface corresponding to the second curved region B2b may connect the upper and lower surfaces of the support member 120 to each other. The second side surface may have a curved shape. Thus, the second side surface may have a semicircular shape in the first direction DR1. The second forming region GA2b may be formed in correspondence with the second side surface.

Exemplary embodiments of the present invention are not limited by the shapes of the first and second curved regions B2a and B2b described herein. For example, the shapes of the first and second curved regions B2a and B2b may vary corresponding to the 3-D shape of the glass G. Thus, since the upper and lower surfaces of the support member 120 may have lengths different from each other in the first direction DR1, the shape of the first and second curved regions B2a and B2b may be variously changed.

According to an exemplary embodiment of the present invention, the first side surface of the support member 120 may be spaced a first distance from the first sidewall 112a in the first direction DR1. The second side surface of the support member 120 may be spaced the first distance from the second sidewall 112b. The first and second side surfaces may each be spaced at predetermined distances from the first and second sidewalls 112a and 112b, respectively. The first distance may be a space in which the glass G is bendable in the thickness direction of the support member 120 in correspondence with each of the first and second curved regions B2a and B2b. Thus, the thickness direction of the support member 120 may be defined as a direction from the upper surface to the lower surface of the support member 120.

The first forming region GA2a may be closer to the first sidewall 112a as compared to the first side surface of the support member 120 in the first direction DR1. For example, the first forming region GA2a may be in direct contact with the first sidewall 112a. Alternatively, the first forming region GA2a may be spaced from the first sidewall 112a by a second distance that is less than the first distance. Thus, the first forming region GA2a may be bent in the thickness direction of the support member 120, for example, through the space between the first curved region B2a and the first sidewall 112a.

The second forming region GA2b may be more closer to the second sidewall 112b than the second side surface of the support member 120 in the first direction DR1. For example, the second forming region GA2b may be in direct contact with the second sidewall 112b. Alternatively, the second forming region GA2b may be spaced from the second sidewall 112b by a second distance that is less than the first distance. Thus, the second first forming region GA2b may be bent in the thickness direction of the support member 120, for example, through the spaced space between the second curved region B2b and the second sidewall 112b.

According to an exemplary embodiment of the present invention, when the first forming region GA2a is bent in the thickness direction of the support member 120, a contact configuration between the first forming region GA2a and the first sidewall 112a may be maintained. Alternatively, the configuration spaced a predetermined distance between the first forming region GA2a and the first sidewall 112a may be maintained. For example, an intake intensity of the suction hole VC by which the first forming region GA2a is pulled in the third direction DR2 may vary according to the distance between the first forming region GA2a and the first sidewall 112a.

As the distance between the first forming region GA2a and the first sidewall 112a increases, the intake intensity of the suction hole VC may decrease. External air may enter into an inner space between the housing member 110 and the glass G through the distance between the first forming region GA2a and the first sidewall 112a. As the distance between the first forming region GA2a and the first sidewall 112a decreases, the intake intensity of the suction hole VC may increase. External air might not be introduced into the inner space when the distance between the first forming region GA2a and the first sidewall is decreased.

Thus, the curved shape of the first sidewall 112a may be determined based on the intake intensity of the suction hole VC and a degree to which the first forming region GA2a is recessed in the thickness of the support member 120.

When the second forming region GA2b is bent in the thickness direction of the support member 120, a contact configuration between the second forming region GA2b and the second sidewall 112b may be maintained. Alternatively, the configuration spaced a predetermined distance between the second forming region GA2b and the second sidewall 112b may be maintained. For example, an intake intensity of the suction hole VC by which the second forming region GA2b is pulled in the third direction DR2 may vary according to the distance between the second forming region GA2b and the second sidewall 112b.

Thus, the curved shape of the second sidewall 112b may be determined based on the intake intensity of the suction hole VC and a degree to which the second forming region GA2b is recessed in the thickness of the support member 120.

Referring to FIG. 4, a thickness of the glass G may have a first length Gt. A distance between the lower surface and the lower part 111 of the support member 120 may have a second length Ht. The first length Gt may be equal to or greater than the second length Ht. Thus, when the first length Gt is less than the second length Ht, the glass G may be spaced apart from the lower part 111 of the support member 120. Accordingly, the intake intensity of the suction hole VC may be decreased.

Referring to FIG. 5, the suction hole VC may be defined in the lower part 111 of the housing member 110. At least one suction hole VC may be defined in the lower part 111. The suction hole VC may have various shapes.

The lower surface and the lower part 111 of the support member 120 may be spaced apart from each other. Thus, an empty space may be defined from the first and second forming regions GA2a and GA2b of the glass G to the suction hole VC defined in the lower part 111 of the support member 120.

According to an exemplary embodiment of the present invention, the first and second forming regions GA2a and GA2b of the glass G may be bent through an intake operation of the suction hole VC in the third direction DR3.

Figure 6:
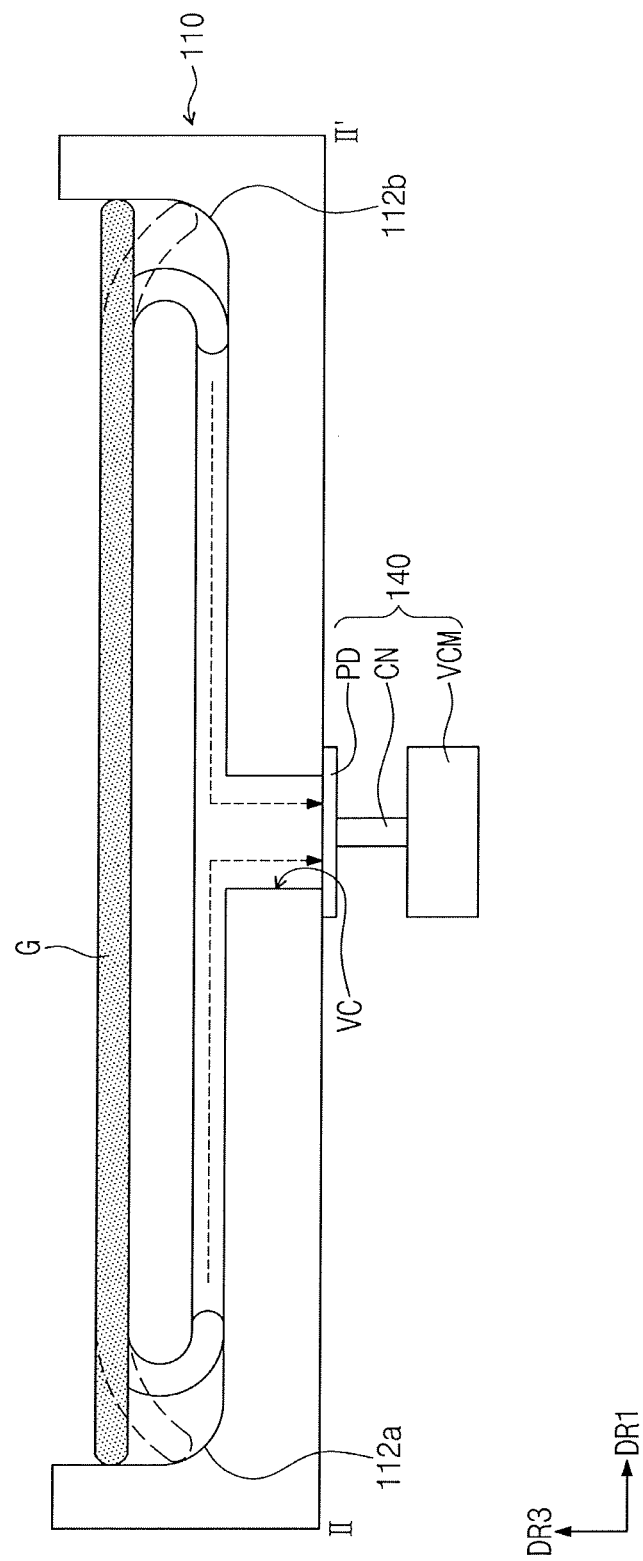
FIG. 6 is a cross-sectional view illustrating a state in which an intake member is coupled to a housing member of FIG. 2 according to an exemplary embodiment of the present invention.

FIG. 6 is a cross-sectional view illustrating a state in which an intake member is coupled to a housing member of FIG. 2 according to an exemplary embodiment of the present invention.

Referring to FIGS. 3 and 6, the intake member 140 may be affixed to the suction hole VC defined in the lower part 111. The intake member 140 may include a suction pad PD, a connection tube CN, and a suction unit VCM. The suction pad PD may be affixed to the suction hole VC. The connection tube CN may be connected to the suction pad PD. The suction unit VCM may be connected to the connection tube CN.

The suction pad PD may be disposed on the lower part 111 of the support member 120. The suction pad PD may be disposed on the lower part 111 to overlap the suction hole VC. A width of the suction pad PD may be greater than a width of the suction hole VC in the first direction DR1.

A first end of the connection tube CN may be connected to a first portion of the suction pad PD. A second portion of the suction pad PD may be connected to the suction unit VCM.

The suction unit VCM may be connected to a second end of the connection tube CN, for example, to perform an intake operation. As the intake operation of the suction unit VCM is performed, air filled into the space between the housing member 110 and the support member 120 may be absorbed through the suction pad PD.

The glass G may be maintained in a relatively high-temperature state. Before the suction unit VCM performs the intake operation, the glass G may be heated at a temperature of about 900° C. by, for example, an external heating device. Thus, the glass G may become flexible.

As the intake operation is performed by the suction unit VCM, the first and second forming regions GA2a and GA2b of the glass G may be bent in the thickness direction of the support member 120.

Figure 7:
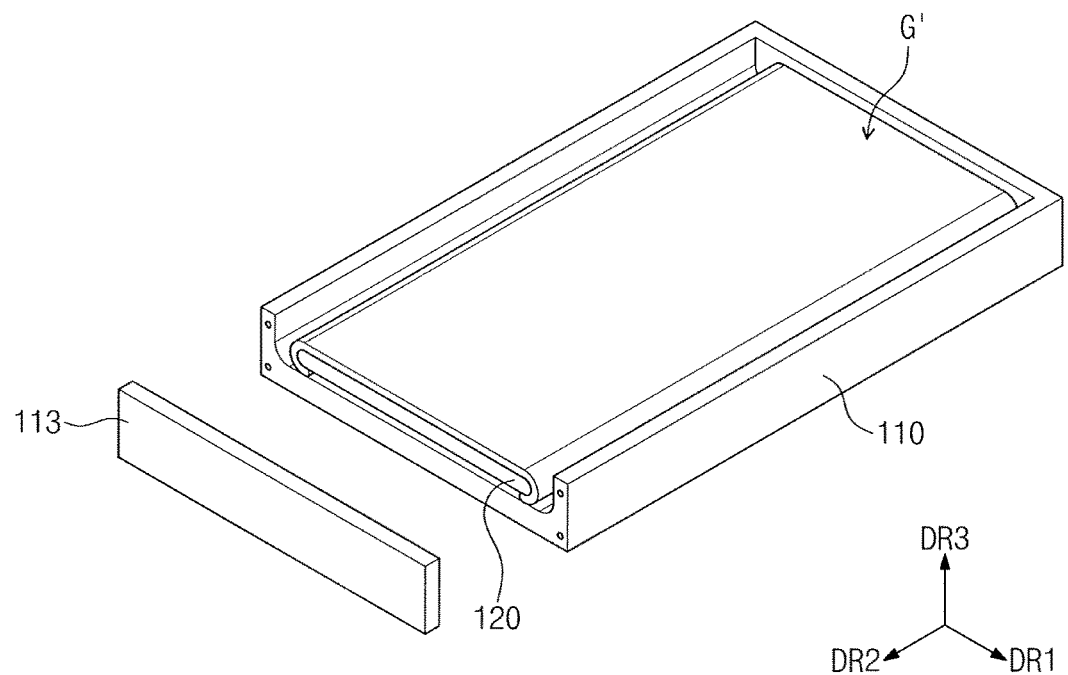
FIG. 7 is a perspective view illustrating a device for forming glass in which one sidewall is separated from a housing member according to an exemplary embodiment of the present invention.
Figure 8:
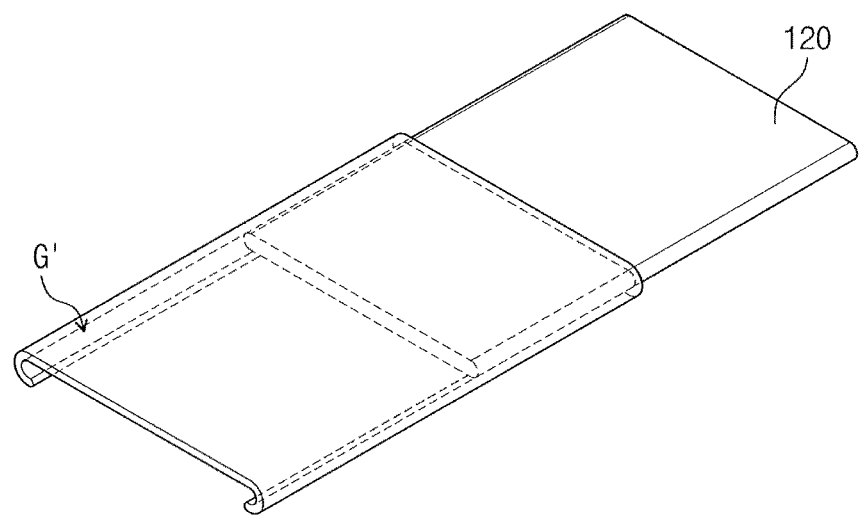
FIG. 8 is a view illustrating a configuration in which glass is separated from a support member according to an exemplary embodiment of the present invention.

FIG. 7 is a perspective view illustrating a device for forming glass in which one sidewall is separated from a housing member according to an exemplary embodiment of the present invention. FIG. 8 is a view illustrating a configuration in which a glass is separated from a support member according to an exemplary embodiment of the present invention.

Referring to FIGS. 7 and 8, a method for forming the glass G may be performed by an apparatus 100. Thereafter, the fourth sidewall 113 may be separated from each of the first and second sidewalls of the housing member 110. A glass G' disposed on the support member 120 may have a 3-D shape.

As the fourth sidewall 113 is separated from the housing member 110, the support member 120 may be separated from the housing member 110 in the second direction DR2. The glass G' disposed on the support member 120 and the support member 120 may together be separated from the housing member 110. Thereafter, the glass G' may be separated from the support member 120 in the second direction DR2.

Figure 9:
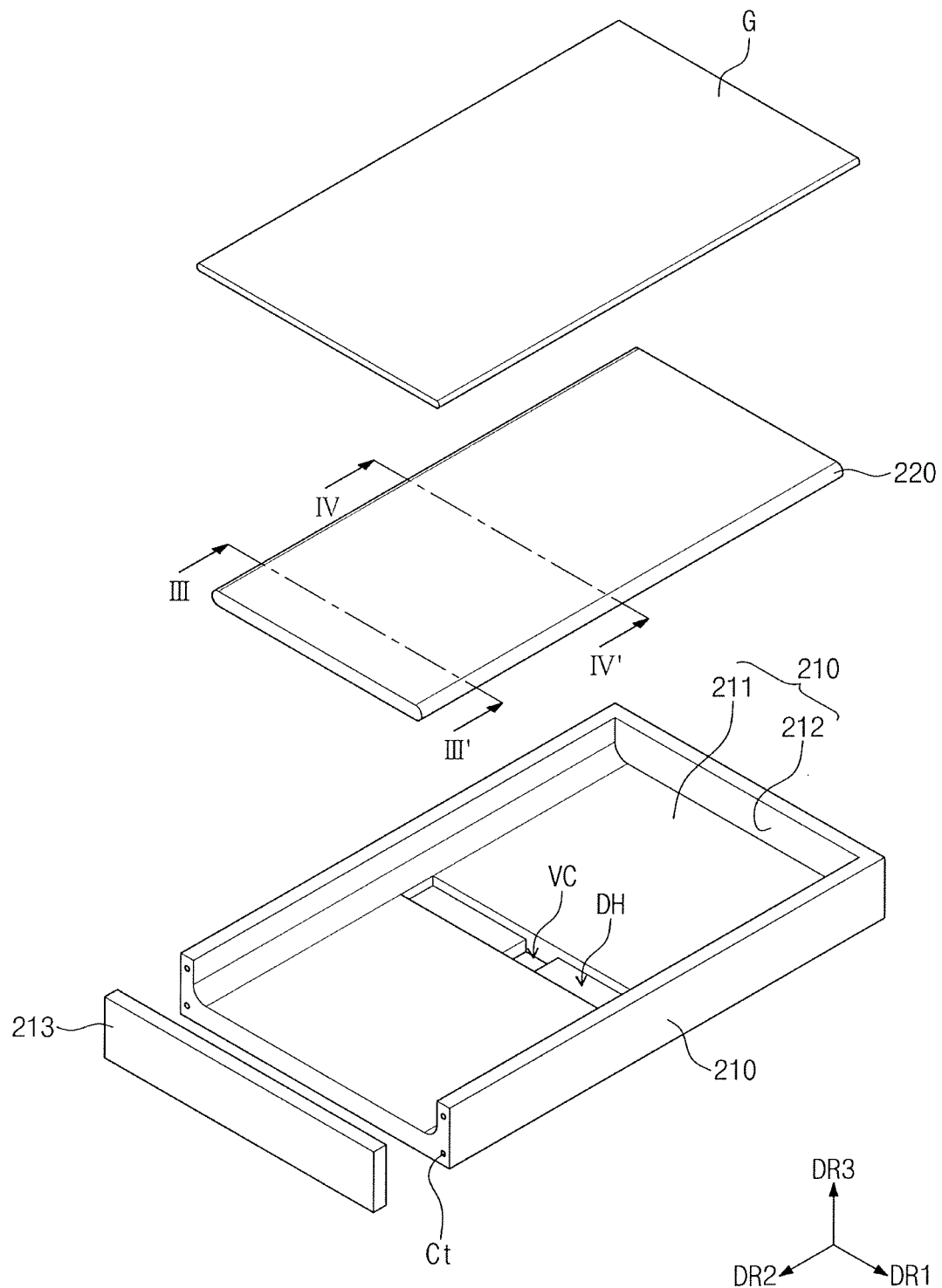
FIG. 9 is an exploded perspective view illustrating a device for forming glass according to an exemplary embodiment of the present invention.
Figure 10:
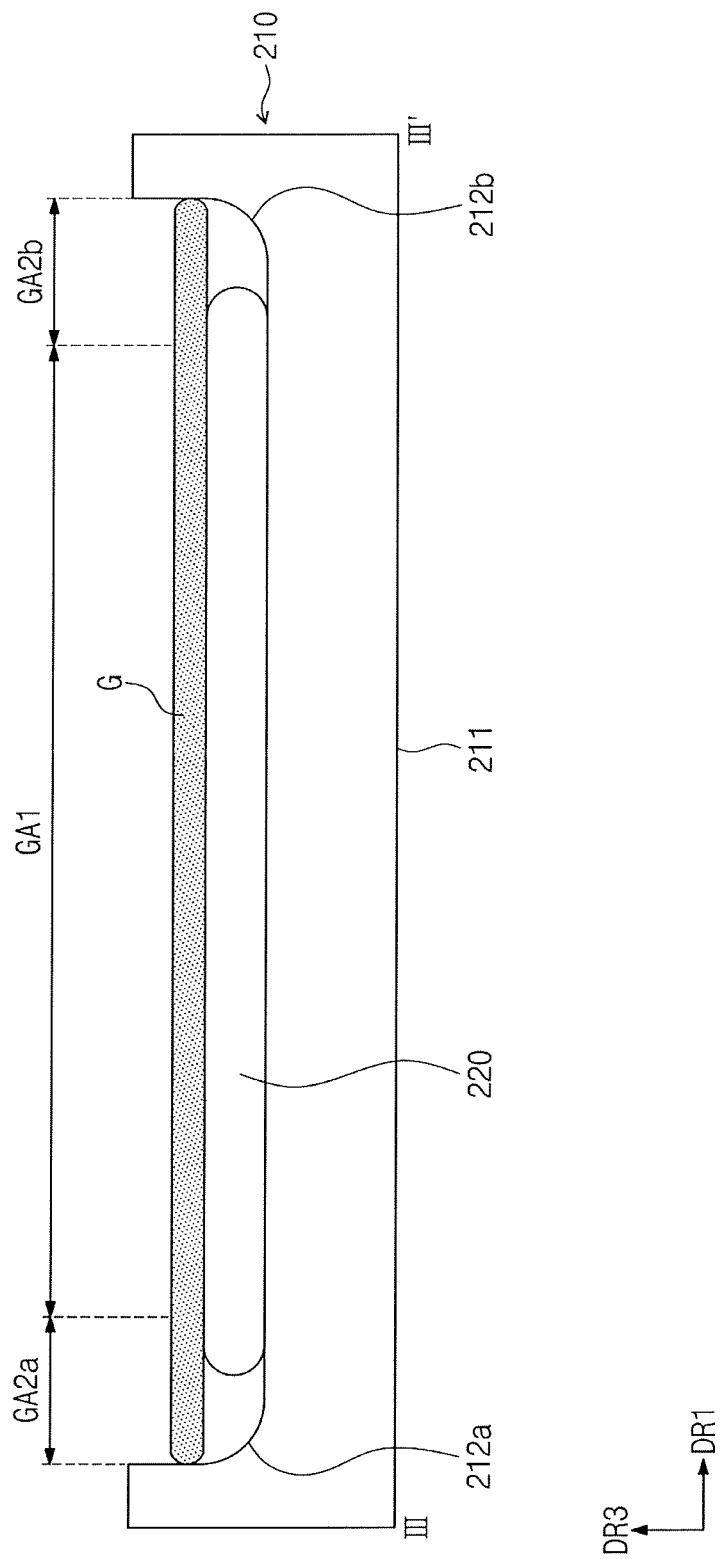
FIG. 10 is a cross-sectional view taken along a line III-III' of FIG. 9 according to an exemplary embodiment of the present invention.
Figure 11:
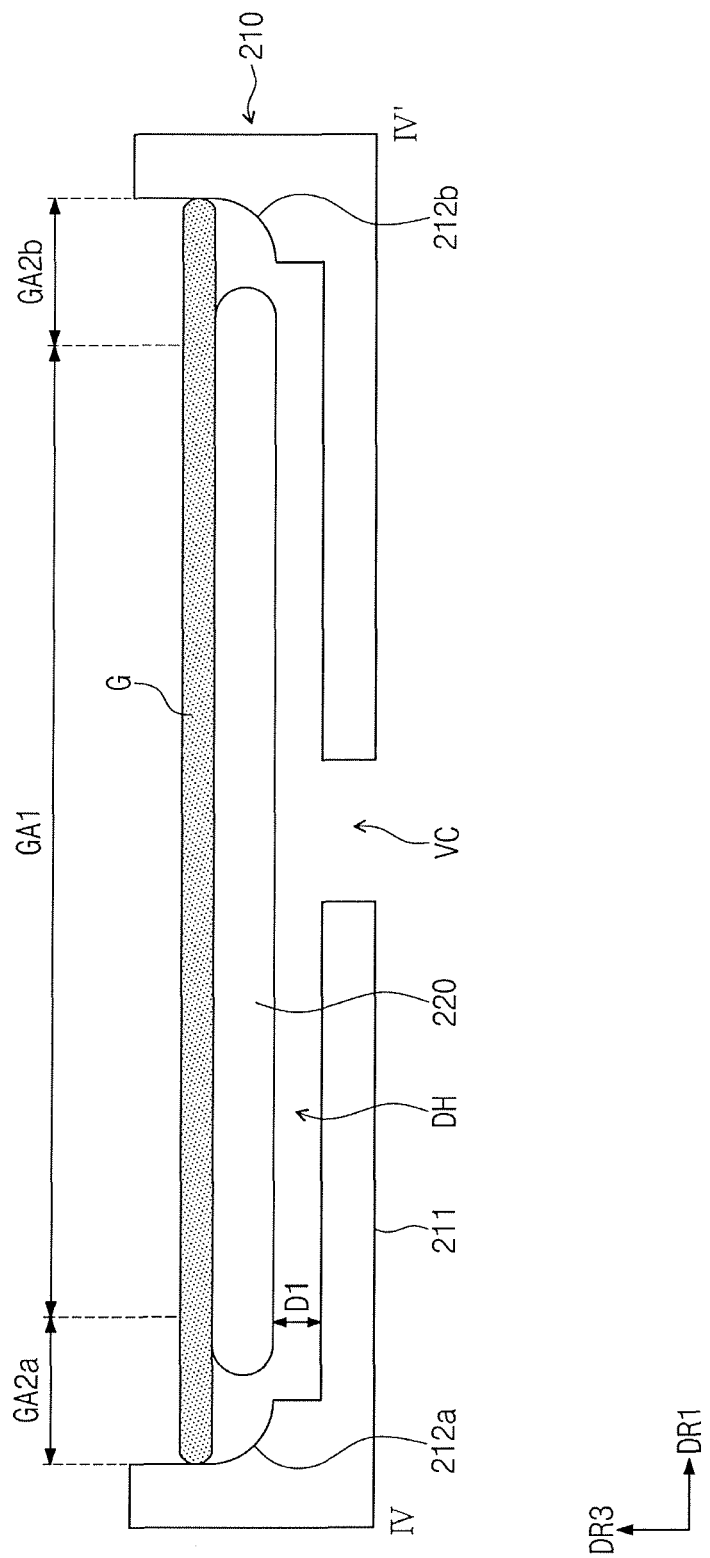
FIG. 11 is a cross-sectional view taken along a line IV-IV' of FIG. 9 according to an exemplary embodiment of the present invention.

FIG. 9 is an exploded perspective view illustrating a device for forming glass according to an exemplary embodiment of the present invention. FIG. 10 is a cross-sectional view taken along a line III-III' of FIG. 9 according to an exemplary embodiment of the present invention. FIG. 11 is a cross-sectional view taken along a line IV-IV' of FIG. 9 according to an exemplary embodiment of the present invention.

Referring to FIG. 9, a device for forming a glass according to an exemplary embodiment of the present invention may include a housing member 210 and a support member 220. The device for forming the glass of FIG. 9 may be substantially the same as the apparatus 100 for forming the glass of FIG. 2 in configuration of the support member 220 except for the housing member 210. The elements not described in detail may be understood to be similar to or identical to corresponding elements that have previously been described.

The housing member 210 may house the support member 220. The housing member 210 may include a lower part 211 and a plurality of sidewalls 212. The support member 220 may be disposed on the lower part 211 of the housing member 210. The sidewalls 211 may extend from the lower part 211 in the third direction DR3.

A suction hole VC may be defined in the lower part 211. The suction hole VC may be defined to pass through the lower part 211. Although one suction hole VC is defined in the lower part 211 in FIG. 9, exemplary embodiments of the present invention are not limited thereto. For example, at least one suction hole VC may be defined in the lower part 211.

A groove DH may be defined in the lower part 211 of the housing member 210. The groove DH may extend in the first direction DR1. The groove DH may be recessed from the lower part 211 in the third direction DR3. The groove DH recessed from the lower part 211 in the third direction may overlap the suction hole VC.

The sidewalls 212 may extend from the lower part 211 in the third direction DR3. The sidewalls 212 may include first to fourth sidewalls respectively extending from first to fourth edges of the lower part 211. The first and second edges may correspond to relatively long sides of the lower part 211 in the second direction DR2. The third and fourth edges may correspond to relatively short sides of the lower part 211 in the first direction DR1.

According to an exemplary embodiment of the present invention, at least a portion of an inner surface of each of the first sidewall and the second sidewall may have a curved shape. The first sidewall may extend from the first edge of the lower part 211. The second sidewall may extend from the second edge of the lower part 211. The first sidewall and the second sidewall may face each other in the first direction DR1. However, exemplary embodiments of the present invention are not limited thereto. For example, the inner surface of each of the first and second sidewalls may have a substantially planar shape. The groove DH of the lower part 211 may be recessed from the first side wall to the second sidewall in the third direction DR3.

The third sidewall may be connected to each of the first and second sidewalls. The third sidewall may extend from the third edge of the lower part 211. The fourth sidewall 213 may extend from the fourth edge of the bottom part 211. The fourth sidewall 213 may face the third sidewall in the second direction DR2. The fourth sidewall 213 may be coupled to each of the first and second sidewalls.

Referring to FIG. 10, the support member 220 may be disposed on the lower part 211 of the housing member 210.

As illustrated in FIG. 10, a lower surface of the support member 220 may be spaced a predetermined distance from the lower part 211 in the third direction DR3. According to an exemplary embodiment of the present invention, when the lower surface of the support member 220 is disposed on the lower part 211, the lower surface may be in direct contact with the lower part 211.

Referring to FIG. 11, the groove DH may be recessed by a first depth D1 from the lower part 211 in the third direction DR3. The groove DH may have a shape that is recessed from the first sidewall 212a to the second sidewall 212b. A portion of the groove DH may overlap the suction hole VC.

According to an exemplary embodiment of the present invention, the groove DH may have a width that is less than a length of the support member 220 in the first direction DR1. The first and second side surfaces of the support member 220 may be spaced from the first and second sidewalls 212a and 212b by a predetermined distance in the first direction DR1, respectively. The groove DH may have a first end closer to the first sidewall 212a than the first side surface in the first direction DR1. A second end of the groove DH may be closer to the second sidewall 212b than the second side surface in the first direction DR1.

A gap having a predetermined distance may be disposed between a distal end of the first sidewall 212a and the first side surface of the support member 220. A gap having a predetermined distance may be disposed between a distal end of the second sidewall 212b and the second side surface of the support member 220. Distal ends of the first and second sidewalls 212a and 212b may be points contacting the lower part 211 of the housing member 210. Thus, when an intake operation is performed by the suction hole VC, first and second forming regions GA2a and GA2b may be bent in a thickness direction of the support member 220.

Figure 12:
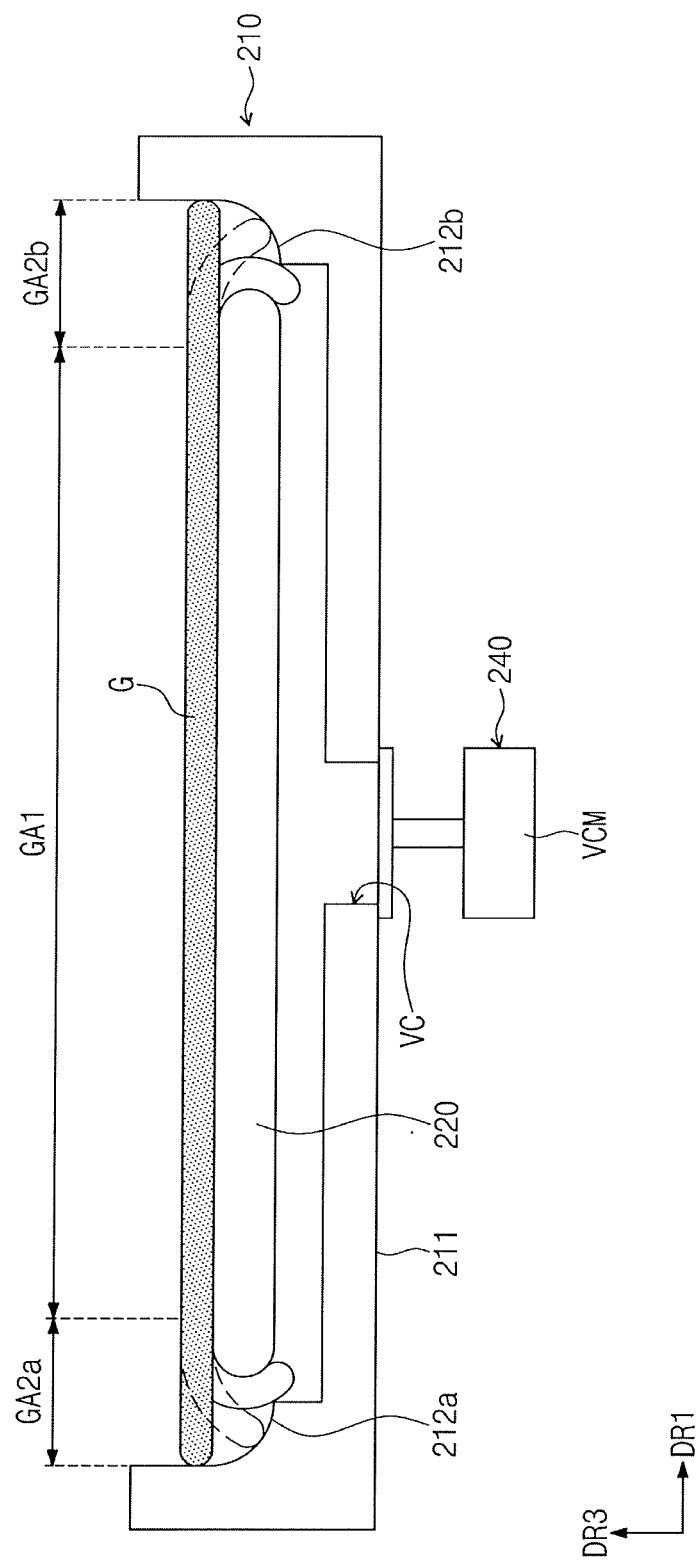
FIG. 12 is a cross-sectional view illustrating a state in which an intake member is coupled to a housing member of FIG. 9 according to an exemplary embodiment of the present invention.

FIG. 12 is a cross-sectional view illustrating a state in which an intake member is coupled to a housing member of FIG. 9 according to an exemplary embodiment of the present invention.

The intake member 240 of FIG. 12 may be substantially the same as the intake member 140 of FIG. 6. Thus, repetitive descriptions thereof may be omitted.

The glass G may be maintained in a relatively high-temperature state. Before the suction unit VCM performs an intake operation, the glass G may be heated at a temperature of about 900° C. by, for example, an external heating device. Thus, the glass G may become flexible.

As the intake operation is performed by the suction unit VCM, the first and second forming regions GA2a and GA2b of the glass G may be bent in the thickness direction of the support member 220.

A gap having a predetermined distance may be disposed between the first sidewall 212a and the first side surface. A gap having a predetermined distance may be disposed between the second sidewall 212b and the second side surface. Thus, when the intake operation is performed by the suction hole VC, the first and second forming regions GA2a and GA2b may be bent in the thickness direction of the support member 220.

Figure 13:
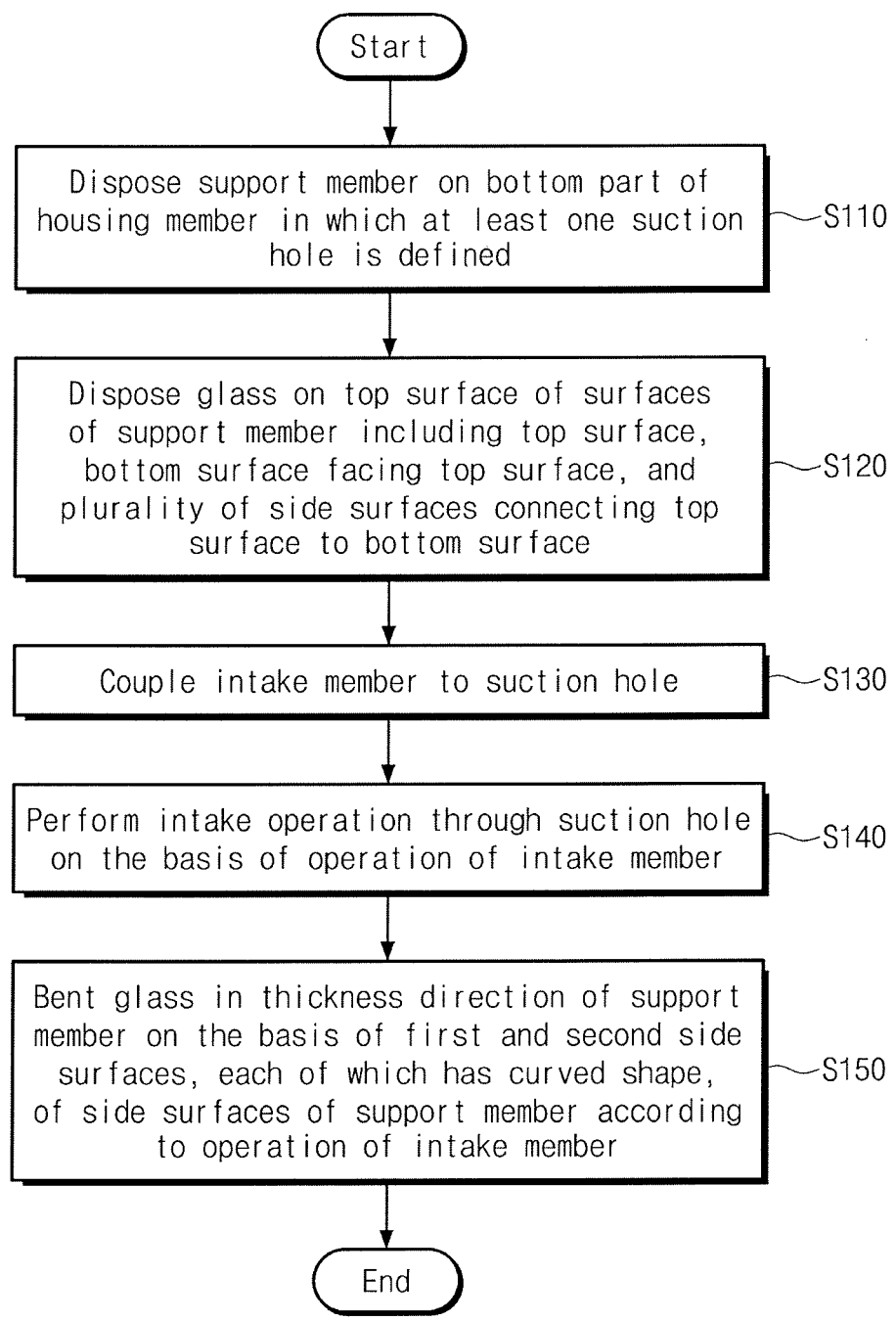
FIG. 13 is a flowchart illustrating an operation of a device for forming glass according to an exemplary embodiment of the present invention.

FIG. 13 is a flowchart illustrating an operation of a device for forming glass according to an exemplary embodiment of the present invention.

Referring to FIGS. 3 and 13, a support member 120 may be disposed on a lower part 111 of a housing member 110, SI 10. At least one suction hole VC may be defined in the lower part 111 of the housing member 110. The housing member 110 may further include a plurality of sidewalls. The sidewalls may extend from the lower part 111 of the housing member 110.

A glass G may be disposed on each of an upper surface of the support member 120, a lower surface of the support member 120, and a plurality of side surfaces of the support member 120, S120. The lower surface of the support member 120 may face the upper surface of the support member 120 in a thickness direction thereof. The side surfaces may connect the upper surface to the lower surface.

An intake member 140 may be coupled to a suction hole VC, 5130.

The intake member 140 may perform an intake operation, for example, through the suction hole VC, S140. As the glass G disposed on the upper surface of the support member 120 is heated to a relatively high temperature, the intake member 140 may perform the intake operation through the suction hole VC. As the glass G is heated to the relatively high temperature, the glass G may be bent by the intake operation.

As the intake member 140 performs the intake operation through the suction hole VC, the glass G may be bent in the thickness of the support member 120 in correspondence to the first and second side surfaces of the side surfaces of the support member 120, S150. The first and second side surfaces of the support member 120 may have a curved shape.

After the operation for forming the glass G is performed, the fourth sidewall 223 may be separated from each of the first and second sidewalls of the housing member 110. The support member 120 and a formed glass G' disposed on the support member 120 may each be separated from the housing member 110. Thereafter, the formed glass G' may be separated from the support member 120.

According to an exemplary embodiment of the present invention, the support member 120 may be disposed on the housing member 110 in which the at least one suction hole VC is defined. The glass G may be disposed on the upper surface of the support member 120. The glass G having a curved shape in correspondence with the curved shape of the support member 120 may be provided.

The support member 120 may be changed to produce the glass G having the different curved shapes. Thus, manufacturing costs for forming the glass may be reduced.

Although exemplary embodiments of the present invention have been described with reference to the accompanying drawings, exemplary embodiments of the present invention are not limited thereto. Those skilled in the art will readily appreciate that many modifications are possible in the exemplary embodiments of the present invention without materially departing from the scope of the present inventive concept.

What is claimed is:

1. A device for forming glass, comprising:
a housing member comprising a first part that is substantially parallel to a surface defined by a first direction and a second direction that crosses the first direction, the housing member further comprising at least one suction hole defined in the first part, and a plurality of sidewalls extending from the first part;
a support member disposed on the first part and comprising a first surface configured to support the glass, a second surface overlapping and facing the first surface in a thickness direction, and a plurality of side surfaces each configured to connect the first surface to the second surface, wherein first and second side surfaces of the side surfaces have an entirely curved shape extending from the first surface to the second surface of the support member; and
an intake member configured to apply vacuum pressure through the suction hole.

2. The device of claim 1, wherein a plurality of grooves are defined in the first part, and
the support member further comprises a plurality of protrusions, each protruding from the second surface and each coupled to the grooves.

3. The device of claim 2, wherein a thickness of each of the protrusions is greater than a depth of each of the grooves in the thickness direction.

4. The device of claim 3, wherein the second surface is spaced apart from the first part by the protrusions, and
the glass has a thickness equal to or greater than a distance between the second surface and the first part.

5. The device of claim 1, wherein the sidewalls comprise first and second sidewalls facing each other in the first direction and respectively extending from first and second edges of the first part, and wherein
the sidewalls further comprise third and fourth sidewalls facing each other in the second direction and respectively extending from third and fourth edges of the first part.

6. The device of claim 5, wherein at least one sidewall of the first to fourth sidewalls is attached to the other sidewalls.

7. The device of claim 5, wherein at least a portion of each of inner surfaces of the first and second sidewalls has a curved shape.

8. The device of claim 5, wherein the first side surface is spaced a predetermined distance from the first sidewall in the first direction, and
the second side surface is spaced by the predetermined distance from the second sidewall in the first direction.

9. The device of claim 8, wherein a distance between the glass and the first sidewall is less than the predetermined distance in the first direction.

10. The device of claim 9, wherein a distance between the glass and the second sidewall is less than the predetermined distance in the first direction.

11. The device of claim 1, wherein the sidewalls comprise first and second sidewalls facing each other in the first direction and respectively extending from first and second edges of the first part, and third and fourth sidewalls facing each other in the second direction and respectively extending from third and fourth edges of the first part, and
the first part comprises at least one groove of which at least an area overlaps the suction hole, the at least one groove recessed from the first sidewall to the second sidewall in the thickness direction.

12. The device of claim 11, wherein the second surface contacts the first part.

13. The device of claim 11, wherein at least a portion of each of inner surfaces of the first and second sidewalls has a curved shape.

14. The device of claim 11, wherein the first side surface is spaced a predetermined distance from the first sidewall in the first direction, and the second side surface is spaced a predetermined distance from the second sidewall in the first direction.

15. The device of claim 14, wherein the groove has a first end closer to the first sidewall than the first side surface in the first direction, and a second end closer to the second sidewall than the second side surface in the first direction.

16. The device of claim 1, wherein the intake member comprises:
a suction pad connected to the first part and overlapping the suction hole;
a connection tube connected to the suction pad; and
a suction unit connected to the connection tube.

17. The device of claim 1, wherein a side surface of the glass is configured to move along a first sidewall of the plurality of sidewalls when the vacuum pressure is applied, and the side surface of the glass bends around the first side surface of the support member to the second surface of the support member.

18. The device of claim 1, wherein the first and second side surfaces of the side surfaces have a semicircular shape.

* * * * *